United States Patent [19]
Adams

[11] Patent Number: 5,372,342
[45] Date of Patent: Dec. 13, 1994

[54] SUPPORT STAND

[76] Inventor: John W. Adams, 934 Mallard Creek Rd. W., Charlotte, N.C. 28262

[21] Appl. No.: 20,591

[22] Filed: Feb. 22, 1993

[51] Int. Cl.5 .................................................. A47F 5/00
[52] U.S. Cl. ...................................... 248/174; 248/150
[58] Field of Search .............. 248/124, 146, 150, 172, 248/346; 108/51.1, 56.1, 57.1, 51.3

[56] References Cited

U.S. PATENT DOCUMENTS

| | | | |
|---|---|---|---|
| 163,202 | 5/1875 | Houston | 248/150 |
| D. 254,994 | 5/1980 | Miereanu et al. | D30/12 |
| 831,268 | 9/1906 | Edick | 248/150 |
| 1,879,837 | 9/1932 | Bierlich | 248/165 |
| 1,940,117 | 12/1933 | Carpos | 45/117 |
| 2,190,623 | 2/1940 | Benson | 248/150 |
| 2,335,020 | 11/1943 | Nehrich | 126/43 |
| 2,386,306 | 10/1945 | Gardiner | 248/150 |
| 2,936,144 | 5/1960 | Otis | 248/150 |
| 3,124,110 | 3/1964 | Buehl | 122/494 |
| 3,904,158 | 9/1975 | Michael | 248/23 |
| 4,056,897 | 11/1977 | Pearce et al. | 47/39 |
| 4,358,958 | 11/1982 | Wehrenberg | 73/428 |
| 4,519,318 | 5/1985 | Weldon-Ming | 248/150 X |
| 5,042,396 | 8/1991 | Shuert | 108/51.1 |
| 5,199,676 | 4/1993 | Kowalewski | 248/149 |

*Primary Examiner*—Robert W. Gibson, Jr.
*Attorney, Agent, or Firm*—W. Thad Adams, III

[57] ABSTRACT

The invention relates to a support stand including at least three outwardly extending and diverging legs. A distal end of each of the legs defines a notional perimeter having at least three corners. Each of the legs extends outwardly to a respective one of the corners. A distal support column is located at respective distal ends of the legs and provides an area of increased rigidity. The support column defines a respective corner of the notional perimeter.

16 Claims, 5 Drawing Sheets

SUPPORT STAND

TECHNICAL FIELD AND BACKGROUND OF THE INVENTION

This invention relates to a support stand for supporting objects, such as a water heater. The stand includes two attached web members with ends extending to respective corners of the stand. The web members define the legs of the stand. A support column is integrally-formed at respective ends of the web members for providing an area of increased rigidity at the corners of the stand.

The support stand of the present invention can be used in several different environments for supporting various objects. Additionally, the size and shape of the stand can be varied to accommodate the particular needs of the buyer or user.

Prior art support stands are less effective than the stand of the present invention. The legs of such stands do not diverge directly to the corners of the stand, but instead extend away from the corner before bending back to the corner edge. This design results in lesser load carrying capacity at the corners of the stand, and an overall weaker structure in comparison to the stand of the present invention. Moreover, the prior art design does not provide integrally-formed support columns at respective corners of the stand.

SUMMARY OF THE INVENTION

Therefore, it is an object of the invention to provide a support stand for supporting various objects.

It is another object of the invention to provide a support stand suitable for mounting a 30, 40, or 50 gallon water heater.

It is another object of the invention to provide a support stand wherein the legs are defined by a plurality of web members.

It is another object of the invention to provide a support stand wherein the legs are made of galvanized sheet metal.

It is another object of the invention to provide a support stand which includes end support columns integrally-formed at respective ends of the legs.

It is another object of the invention to provide a support stand which includes an area of increased rigidity at the corners of the support stand.

It is another object of the invention to provide a support stand which includes a cap and a base, wherein the cap is made of a heavier gauge metal than the base to supply greater support.

It is another object of the invention to provide a support stand which is light-weight and easy to assemble.

These and other objects of the present invention are achieved in the preferred embodiments disclosed below by providing a support stand including at least three outwardly extending and diverging legs. A distal end of each of the legs defines a notional perimeter having at least three corners. Each of the legs extends outwardly to a respective one of the corners. A distal support column is located at respective distal ends of the legs and provides an area of increased rigidity. The support column defines a respective corner of the notional perimeter.

According to one preferred embodiment of the invention, the support column is formed by a plurality of successive bends in the legs, thereby producing respective bend segments. All of the bends are in the clockwise direction or the counterclockwise direction.

According to another preferred embodiment of the invention, the support column is formed by a first bend producing a first bend segment diagonally extending from one distal end of the leg to the notional perimeter, a second bend segment produced by a second bend made essentially 90 degrees to the direction of the first bend segment and extending along the notional perimeter to a corner edge of the notional perimeter, and a third bend made essentially 90 degrees to the second bend segment for producing a third bend segment. The second and third bend segments define one of the corners of the notional perimeter.

Preferably, each of the legs substantially bisects a notional angle defined by the corner of the notional perimeter.

According to yet another preferred embodiment of the invention, each of the legs is defined by a substantially solid web member.

According to yet another preferred embodiment of the invention, the web members include complementary cut-outs for allowing overlapping and interlocking engagement of the web members.

According to yet another preferred embodiment of the invention, the web members are attached to each other by a weld connection.

Preferably, the support stand further includes a base for mounting the legs and respective support columns thereon.

Preferably, the support stand further includes a cap for mounting the legs and respective support columns thereon. The cap is located on a side of the legs opposite the base to sandwich the legs between the base and the cap to thereby form a unitary structure.

According to another preferred embodiment of the invention, the support stand includes at least two substantially solid web members, and at least three outwardly extending and diverging legs defined by the web members. A distal end of each of the legs defines a notional perimeter having at least three corners. Each of the legs extends outwardly to a respective one of the corners. A distal support column is located at respective distal ends of the legs for providing an area of increased rigidity and for defining a respective corner of the notional perimeter. The support column is formed by a plurality of successive bends, all of which are in the clockwise direction or all in the counterclockwise direction.

According to yet another preferred embodiment of the invention, the support stand includes two substantially solid web members including complementary center cut-outs for allowing overlapping and interlocking engagement of the web members. The web members define four outwardly extending and diverging legs. The distal ends of the legs define a notional perimeter having four corners. Each of the legs extends outwardly to a respective one of the four corners. A distal support column is located at respective distal ends of the legs for providing an area of increased rigidity, and for defining a respective corner of the notional perimeter. The support column is formed by a plurality of successive bends, all of which are in the clockwise direction or all in the counterclockwise direction. A base mounts the legs and respective support columns thereon, and a cap is located on a side of the legs opposite the base to sandwich the legs between the base and the cap to form a unitary structure.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
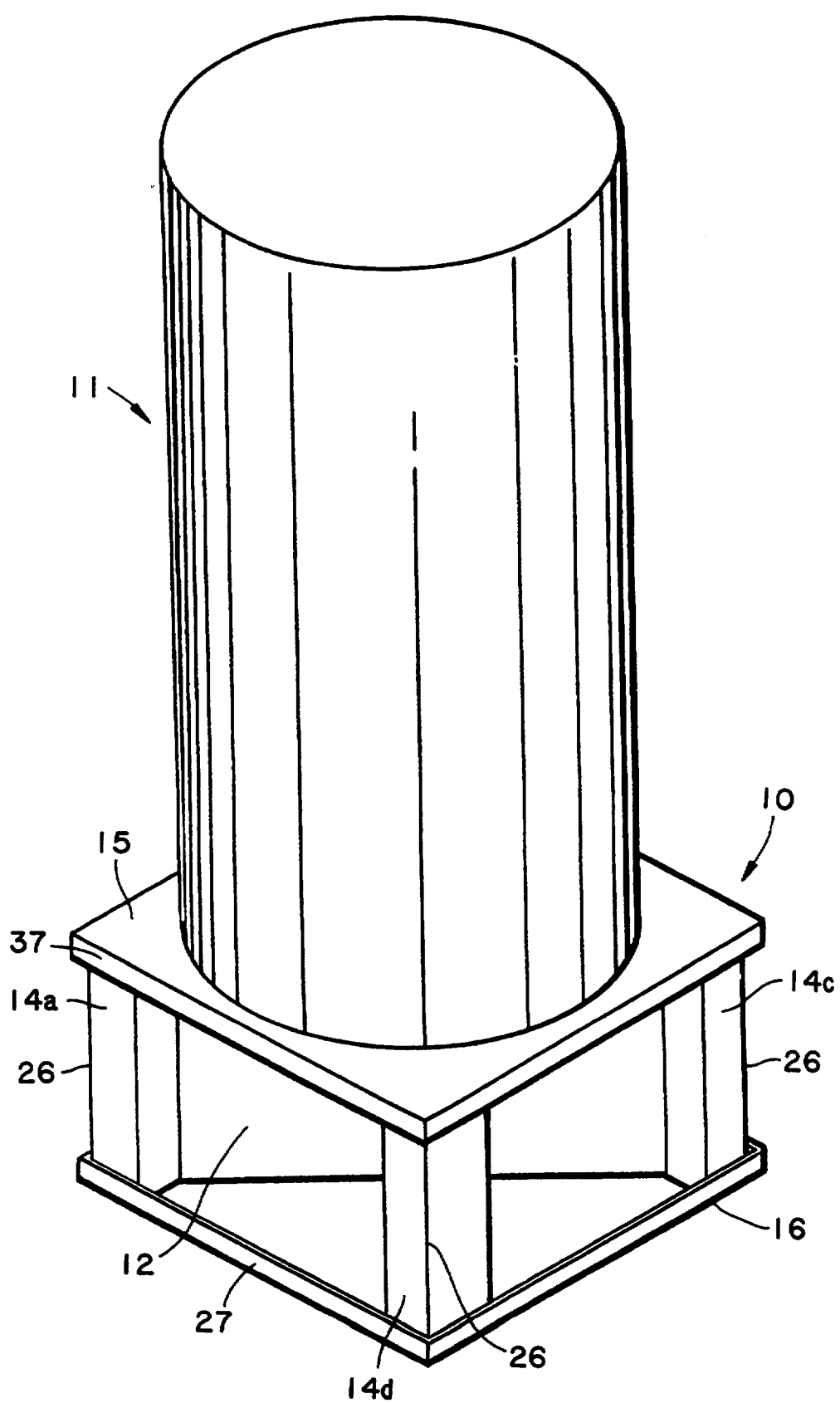
FIG. 1 is a perspective view of a support stand according to a preferred embodiment of the invention showing a water heater mounted thereon.

Referring now specifically to the drawings, a support stand according to the present invention is illustrated in FIG. 1 and shown generally at reference numeral 10. As shown in FIG. 1, the support stand 10 is designed for mounting an object 11. The support stand 10 is particularly suited for mounting a 30, 40 or 50 gallon water heater for residential use, although larger stands for heavier loads are attainable. A typical water heater is shown in FIG. 1 as an example.

Figure 2:
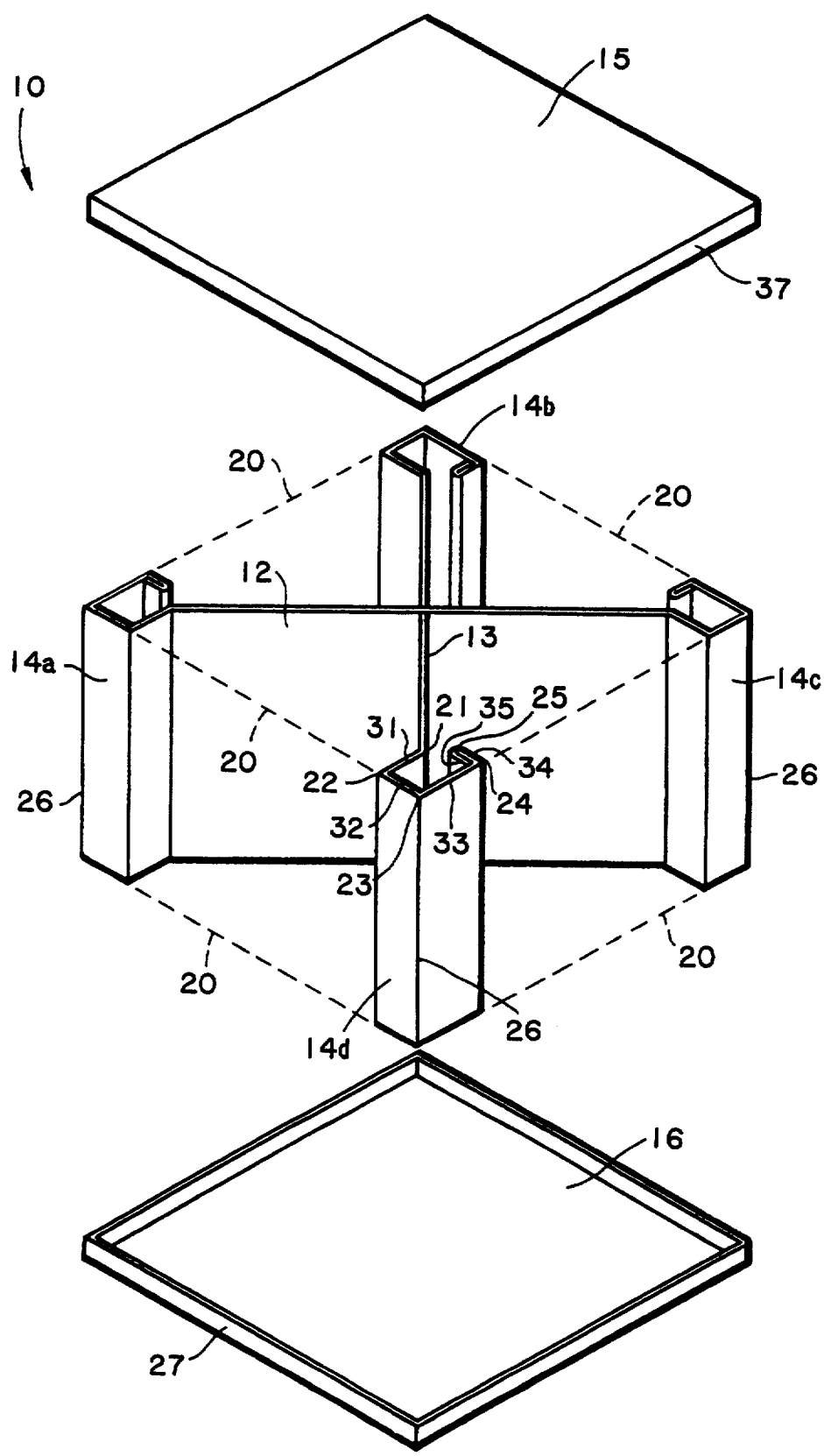
FIG. 2 is a perspective view of the support stand illustrating a notional perimeter about the web members, and showing the cap and base separate from the web members.

As shown in FIGS. 1 and 2, the support stand 10 generally includes first and second web members 12 and 13, four integrally-formed support columns 14a-d, a cap 15, and a base 16. The web members 12 and 13 define the legs of the stand 10, and according to one embodiment, are approximately 2.8 ft. long and 1.5 ft. high. Preferably, each web member 12 and 13 is made of an imperforate, 22-gauge galvanized sheet metal. However, according to another embodiment (not shown), the web members 12 and 13 may include one or more voids or openings through their respective planer surfaces to reduce the weight of the stand 10. As is best shown in FIG. 2, support columns 14a-d are integrally-formed at respective distal ends of the web members 12 and 13 by a plurality of bends 21, 22, 23, 24, and 25. The bends 21-25 form respective bend segments 31, 32, 33, 34 and 35 to thereby define the integral support column 14.

Figure 3:
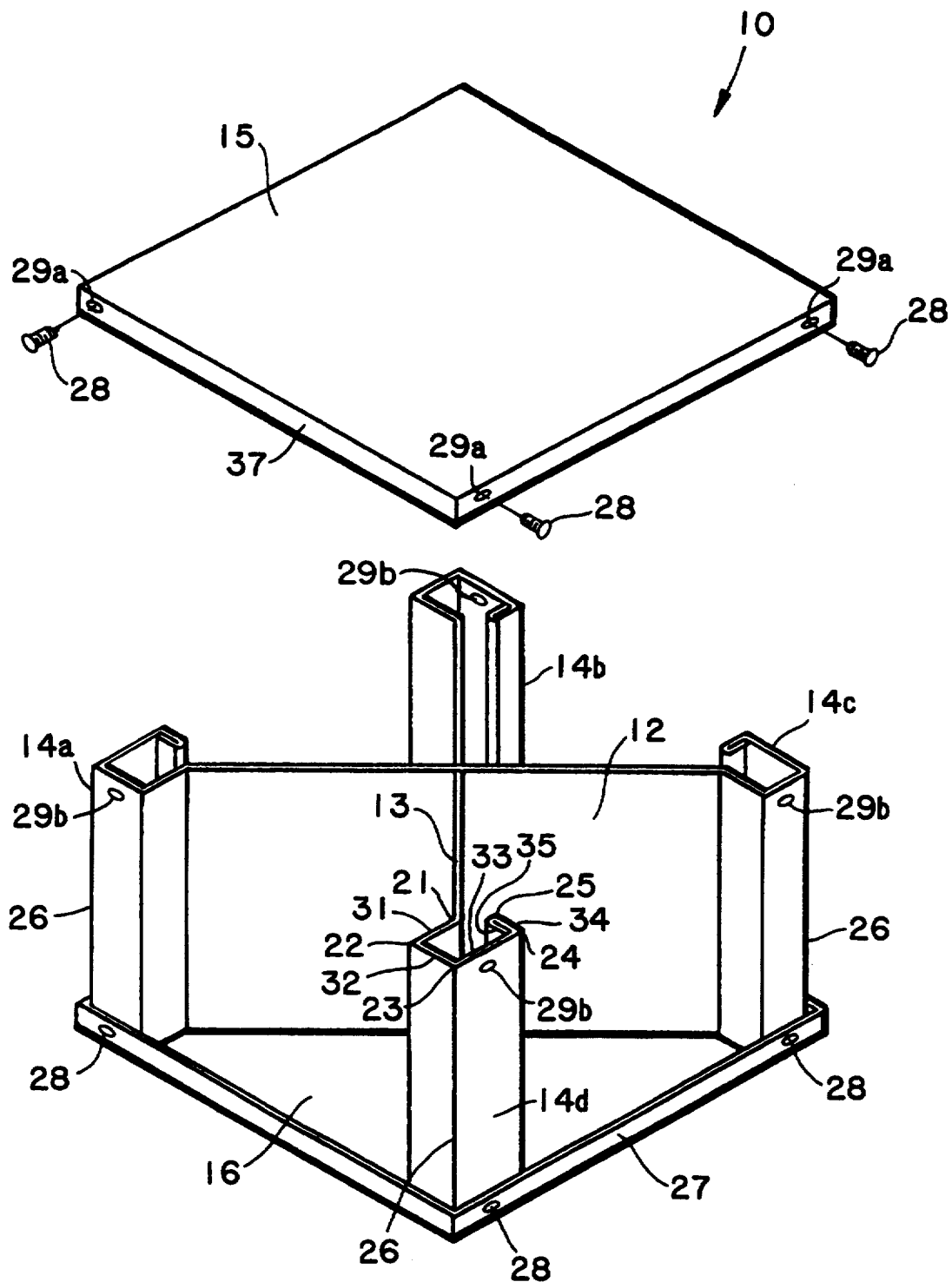
FIG. 3 is a perspective view of the support stand according to an alternate embodiment showing the web members attached to the base by screws.

As best shown in FIGS. 2 and 3, all of the bends 21-25 are either in the clockwise direction, or all are in the counterclockwise direction. The respective support columns 14a-d are formed by a first bend 21 producing a first bend segment 31 diagonally extending from one distal end of the web member 13 to a notional perimeter 20 (See FIG. 2). A second bend segment 32 is then produced by a second bend 22 made essentially 90 degrees to the direction of the first bend segment 31. The second bend segment 32 extends adjacent the notional perimeter 20 to a vertical edge 26 of the support stand 10. A third bend 23 is then made essentially 90 degrees to the second bend segment 32 for producing a third bend segment 33. The second and third bend segments 32 and 33 define one of the four vertical edges 26 of the support stand 10.

Preferably, the support column 14 further includes forth and fifth bends 24 and 25, and corresponding forth and fifth bend segments 34 and 35. The forth bend 24 is made essentially 90 degrees to the direction of the third bend segment 33, thereby forming a forth bend segment 34. The fifth bend 25 is made essentially 180 degrees to the direction of the forth bend segment 34, and results in a fifth bend segment 35 which folds back on or overlaps the forth bend segment 34. The forth and fifth bend segments 34 and 35 serve to produce a substantially rectangular or square-shaped support column 14.

According to one preferred embodiment, the cap 15 and the base 16 are each square-shaped, and act to sandwich the web members 12 and 13 and the support columns 14a-d therebetween. The cap 15 and base 16 could also be various other geometric shapes, such as triangular or circular to substantially define a triangular or circular support stand 10, respectively, having three or more legs. Preferably, the cap 15 is made of a 16-gauge metal while the base 16 is made of 22-gauge metal. The added thickness of the cap 15 increases the load carrying capacity of the support stand 10. A perimeter lip 37 and 27 is integrally-formed on respective sides of the cap 15, and respective sides of the base 16. The lip 37 and 27 extends inward of the stand 10, and perpendicular to the respective sides of the cap 15 and base 16.

According to an embodiment shown in FIG. 3, the cap 15 and base 16 are securely attached to the support stand 10 by screws 28, such as metal or tek screws, inserted in and through corresponding guide holes 29a and 29b formed in the perimeter lip 27 and 37 and support columns 14a-d, respectively. FIG. 3 illustrates the cap 15 in a detached position, while the base 16 is attached by the screws 28. The screw 28 is inserted in and through the perimeter lip 27, substantially at or near a respective one of the eight corners of the support stand 10, and through respective ends of each support column 14a-d. Accordingly, there is one screw attachment for each of the eight corners of the support stand 10. The fixed attachment of the cap 15 and base 16 allows the support stand 10 to be sold or transferred as a unitary structure.

Figure 4:
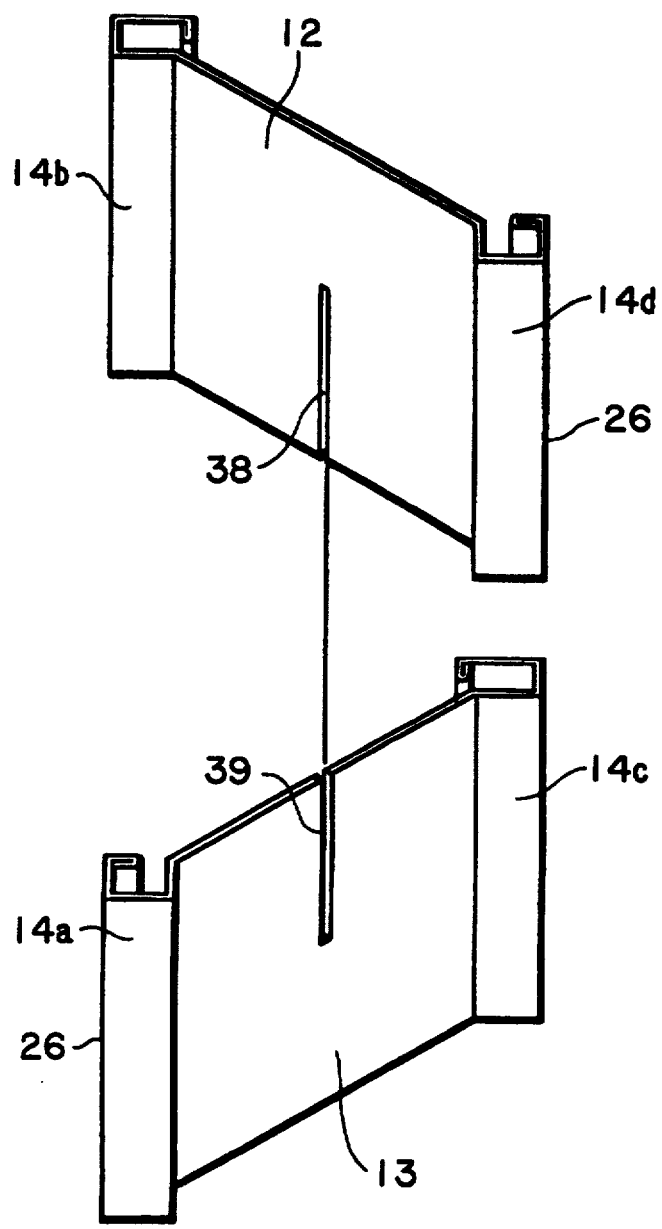
FIG. 4 is a partial, exploded perspective view of separated web members illustrating the overlapping engagement of the web members according to one embodiment of the invention.

Referring now to FIG. 4, the attachment of web members 12 and 13 is shown according to one preferred embodiment of the invention. Each web member 12 and 13 includes complementary cut-outs 38 and 39 for providing overlapping and interlocking engagement of the web members 12 and 13. This engagement allows distal ends of the web members 12 and 13 to diverge to respective corners of the support stand 10, while strengthening the overall stability of the support stand 10.

Figure 5:
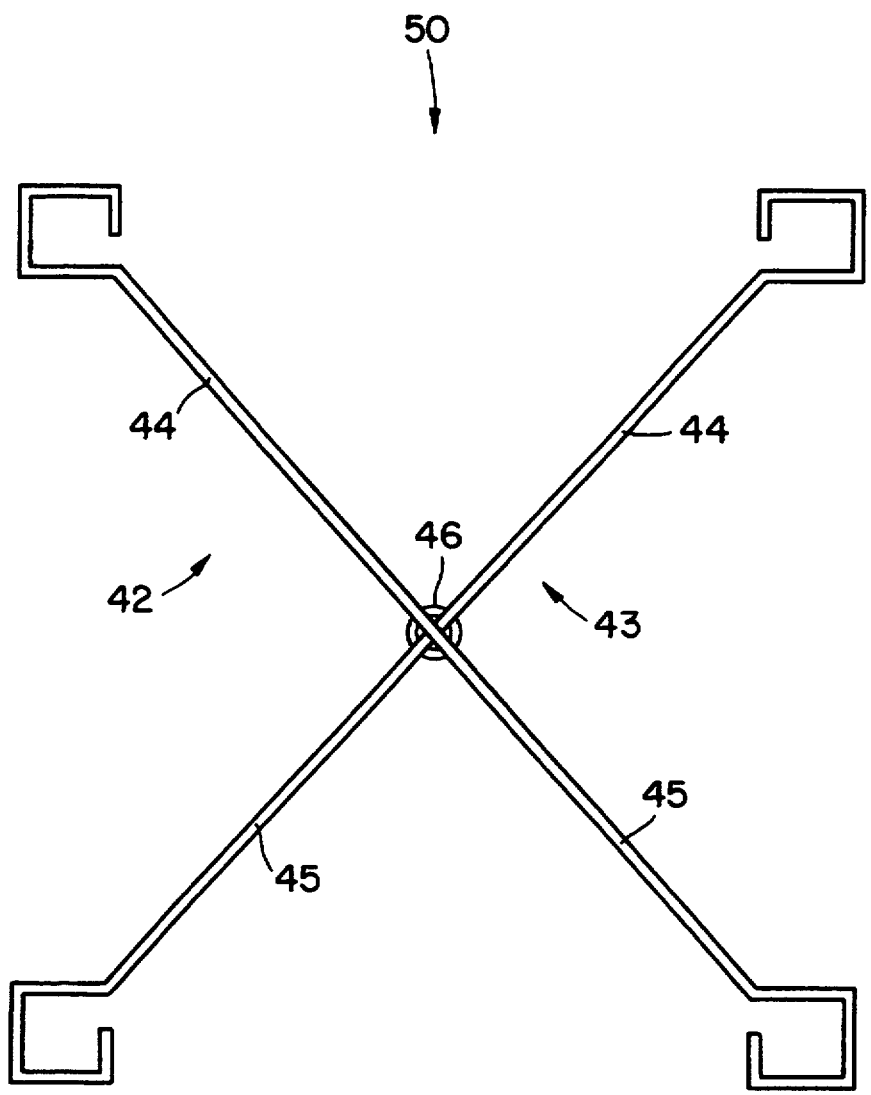
FIG. 5 is a top plan view of the support stand according to an alternate embodiment, showing the web members attached to each other by a weld connection.

An alternate means of attaching the web members is illustrated in FIG. 5. According to this embodiment, each web member 42 and 43 is bent at the center to form a right angle having distal end segments 44 and 45 of substantially the same length. The distal end segments 44 and 45 define opposite sides of a notional triangle formed by the web member 42. The web members 42 and 43 are positioned adjacent to each other such that their respective end segments 44 and 45 extend to respective corners of the support stand 10. The web members 42 and 43 are welded together, thus forming a weld connection 46 securely attaching each member to the other.

Assembly of the stand 10, according to the overlapping web attachment of FIGS. 1–4, is relatively uncomplicated. First, the base 16 is placed on the floor or ground with the perimeter lip 27 facing upward. Web member 13 with cut-out 39 facing upward is then placed within the base 16 and perimeter lip 27 such that bend segments 32 and 33 of the support columns 14a and 14c are positioned in respective corners of the base 16, adjacent the inner side of perimeter lip 27. Web member 12 with cut-out 38 facing down is then placed over web member 13 such that cut-outs 38 and 39 intersect, thus allowing web members 12 and 13 to overlap each other. Support columns 14b and 14d are positioned within the base 16 and perimeter lip 27 in the same manner as support columns 14a and 14c. Web members 12 and 13 are substantially interlocked by the insertion of the web members 12 and 13 through their respective cut-outs 38 and 39. Finally, the cap 15 is placed over the web members 12 and 13 and support columns 14a–d. Screws 28 may be inserted to attach the cap 15 and base 16 to the support stand 10, as described above (see FIG. 3).

A support stand according to the present invention is described above. Various details of the invention may be changed without departing from its scope. Furthermore, the foregoing description of the preferred embodiment of the invention is provided for the purpose of illustration only and not for the purpose of limitation-the invention being defined by the claims.

I claim:

1. A support stand, comprising:
   (a) at least three outwardly extending and diverging legs, a distal end of each of said legs defining a notional perimeter having at least three corners, and each of said legs extending outwardly to a respective one of said corners;
   (b) a distal support column located at respective distal ends of said legs for providing an area of increased rigidity, said support column defining a respective corner of said notional perimeter; and
   (c) a base for mounting said legs and respective support columns thereon.

2. A support stand according to claim 1, wherein said support column is formed by a plurality of successive bends in said legs producing respective bend segments, all of said bends being in the clockwise direction or all in the counterclockwise direction.

3. A support stand according to claim 2, wherein said support column is formed by a first bend producing a first bend segment diagonally extending from one distal end of said leg to said notional perimeter, a second bend segment produced by a second bend made essentially 90 degrees to the direction of the first bend segment and extending along the notional perimeter to a corner edge of said notional perimeter, and a third bend made essentially 90 degrees to the second bend segment for producing a third bend segment, said second and third bend segments defining one of said corners of said notional perimeter.

4. A support stand according to claim 1, wherein each of said legs substantially bisects a notional angle defined by the corner of said notional perimeter.

5. A support stand according to claim 1, wherein each of said legs is defined by a substantially solid web member.

6. A support stand according to claim 5, wherein said web members include complementary cut-outs for allowing overlapping and interlocking engagement of said web members.

7. A support stand according to claim 5, wherein said web members are attached to each other by a weld connection.

8. A support stand according to claim 1, further comprising a cap for mounting said legs and respective support columns thereon, said cap located on a side of said legs opposite the base to sandwich the legs between said base and said cap to thereby form a unitary structure.

9. A support stand, comprising:
   (a) at least two substantially solid web members;
   (b) at least three outwardly extending and diverging legs defined by said web members, a distal end of each of said legs defining a notional perimeter having at least three corners, and each of said legs extending outwardly to a respective one of said corners;
   (c) a distal support column located at respective distal ends of said legs for providing an area of increased rigidity and for defining a respective corner of said notional perimeter, said support column being formed by a plurality of successive bends, all of said bends being in the clockwise direction or all in the counterclockwise direction; and
   (d) a base for mounting said legs and respective support columns thereon.

10. A support stand according to claim 9, wherein said support column is formed by a first bend producing a first bend segment diagonally extending from one distal end of said leg to said notional perimeter, a second bend segment produced by a second bend made essentially 90 degrees to the direction of the first bend segment and extending along the notional perimeter to a corner edge of said notional perimeter, and a third bend made essentially 90 degrees to the second bend segment for producing a third bend segment, said second and third bend segments defining one of said corners of said notional perimeter.

11. A support stand according to claim 9, wherein each of said legs substantially bisects a notional angle defined by the respective corner of said notional perimeter.

12. A support stand according to claim 9, wherein each of said legs is defined by a substantially solid web member.

13. A support stand according to claim 12, wherein said web members include complementary cut-outs for allowing overlapping and interlocking engagement of said web members.

14. A support stand according to claim 12, wherein said web members are attached to each other by a weld connection.

15. A support stand according to claim 10, further comprising a cap for mounting said legs and respective support columns thereon, said cap located on a side of said legs opposite the base to sandwich the legs between said base and said cap to thereby form a unitary structure.

16. A support stand, comprising:
   (a) two substantially solid web members including complementary center cut-outs for allowing overlapping and interlocking engagement of said web members;
   (b) four outwardly extending and diverging legs defined by said web members, distal ends of said legs defining a notional perimeter having four corners, and each of said legs extending outwardly to a respective one of said four corners;

(c) a distal support column located at respective distal ends of said legs for providing an area of increased rigidity and for defining a respective corner of said notional perimeter, said support column being formed by a plurality of successive bends, all of said bends being in the clockwise direction or all in the counterclockwise direction;

(d) a base for mounting said legs and respective support columns thereon; and (e) a cap for mounting said legs and respective support columns thereon, said cap located on a side of said legs opposite the base to sandwich the legs between said base and said cap to thereby form a unitary structure.

* * * * *